US011912180B2

(12) United States Patent
Fischer et al.

(10) Patent No.: US 11,912,180 B2
(45) Date of Patent: Feb. 27, 2024

(54) REAR OCCUPANT IMPACT ABSORPTION ASSEMBLY

(71) Applicant: Lear Corporation, Southfield, MI (US)

(72) Inventors: Harald Fischer, Sindelfingen (DE); Jaroslav Solc, Plzen (CZ); Ulrich Schneider, Isen (DE); Raphael Markert, Sindelfingen (DE); Dorit Bachmann, Sindelfingen (DE); Sybille Bruns, Sindelfingen (DE)

(73) Assignee: LEAR CORPORATION, Southfield, MI (US)

( * ) Notice: Subject to any disclaimer, the term of this patent is extended or adjusted under 35 U.S.C. 154(b) by 87 days.

(21) Appl. No.: 17/208,224

(22) Filed: Mar. 22, 2021

(65) Prior Publication Data

US 2021/0206300 A1 Jul. 8, 2021

Related U.S. Application Data

(62) Division of application No. 16/269,883, filed on Feb. 7, 2019, now Pat. No. 10,974,624.

(30) Foreign Application Priority Data

Feb. 9, 2018 (DE) .................... 10 2018 202 032.9

(51) Int. Cl.
*B60N 2/42* (2006.01)
*B60N 2/427* (2006.01)
*B60N 2/68* (2006.01)
*B60R 21/00* (2006.01)
*B60R 22/26* (2006.01)

(52) U.S. Cl.
CPC ....... *B60N 2/4228* (2013.01); *B60N 2/42709* (2013.01); *B60N 2/68* (2013.01); *B60N 2/4221* (2013.01); *B60R 22/26* (2013.01); *B60R 2021/0032* (2013.01)

(58) Field of Classification Search
CPC ..... B60N 2/4228; B60N 2/42709; B60N 2/68
See application file for complete search history.

(56) References Cited

U.S. PATENT DOCUMENTS

| 3,523,710 A | 8/1970 | Barecki et al. |
| 3,528,703 A | 9/1970 | Phta |
| 3,537,751 A | 11/1970 | Inoue et al. |
| 3,544,164 A | 12/1970 | Ohta |

(Continued)

FOREIGN PATENT DOCUMENTS

| DE | 2318615 A1 | 11/1973 |
| DE | 102008049641 A1 | 6/2009 |

(Continued)

OTHER PUBLICATIONS

Office Action dated Jan. 28, 2019 of German Application No. 102018202032.9, 5 pages.

(Continued)

*Primary Examiner* — Milton Nelson, Jr.
(74) *Attorney, Agent, or Firm* — Brooks Kushman P.C.

(57) ABSTRACT

An impact absorption assembly for a seat back is provided having a deformation zone as least partially disposed above a top surface of a seat back structure. The deformation zone deforms plastically upon an impact from a rearward direction.

21 Claims, 5 Drawing Sheets

(56) References Cited

U.S. PATENT DOCUMENTS

| | | | |
|---|---|---|---|
| 3,761,125 A | | 9/1973 | Glance |
| 3,804,396 A | * | 4/1974 | Seybold .................. F16F 7/125 |
| | | | 188/371 |
| 3,877,749 A | | 4/1975 | Sakurai et al. |
| 4,252,341 A | | 2/1981 | Barecki et al. |
| 4,718,720 A | | 1/1988 | Braun et al. |
| 5,700,545 A | | 12/1997 | Audi et al. |
| 5,722,731 A | | 3/1998 | Chang |
| 7,748,779 B2 | | 7/2010 | Zimmerman et al. |
| 7,954,893 B2 | | 6/2011 | Yokota et al. |
| 9,033,399 B2 | | 5/2015 | Marur et al. |
| 9,446,697 B2 | | 9/2016 | Akutsu et al. |
| 9,586,508 B2 | | 3/2017 | Yasuda et al. |
| 9,610,871 B2 | | 4/2017 | Yasuda et al. |
| 2003/0001413 A1 | | 1/2003 | Albrecht |
| 2009/0200843 A1 | * | 8/2009 | Yokota .................. B60N 2/888 |
| | | | 297/216.12 |

FOREIGN PATENT DOCUMENTS

| | | | | | |
|---|---|---|---|---|---|
| EP | 0017388 A1 | | 10/1980 | | |
| FR | 2905056 A1 | * | 2/2008 | ........... | B60N 2/6671 |
| FR | 2914883 A1 | | 10/2008 | | |
| JP | 2010137674 A | * | 6/2010 | | |
| WO | WO-2007048256 A | * | 5/2007 | ........... | B60N 2/4228 |

OTHER PUBLICATIONS

Office Action for German Application No. 102018202032.9, dated Aug. 31, 2022, 6 pages.

* cited by examiner

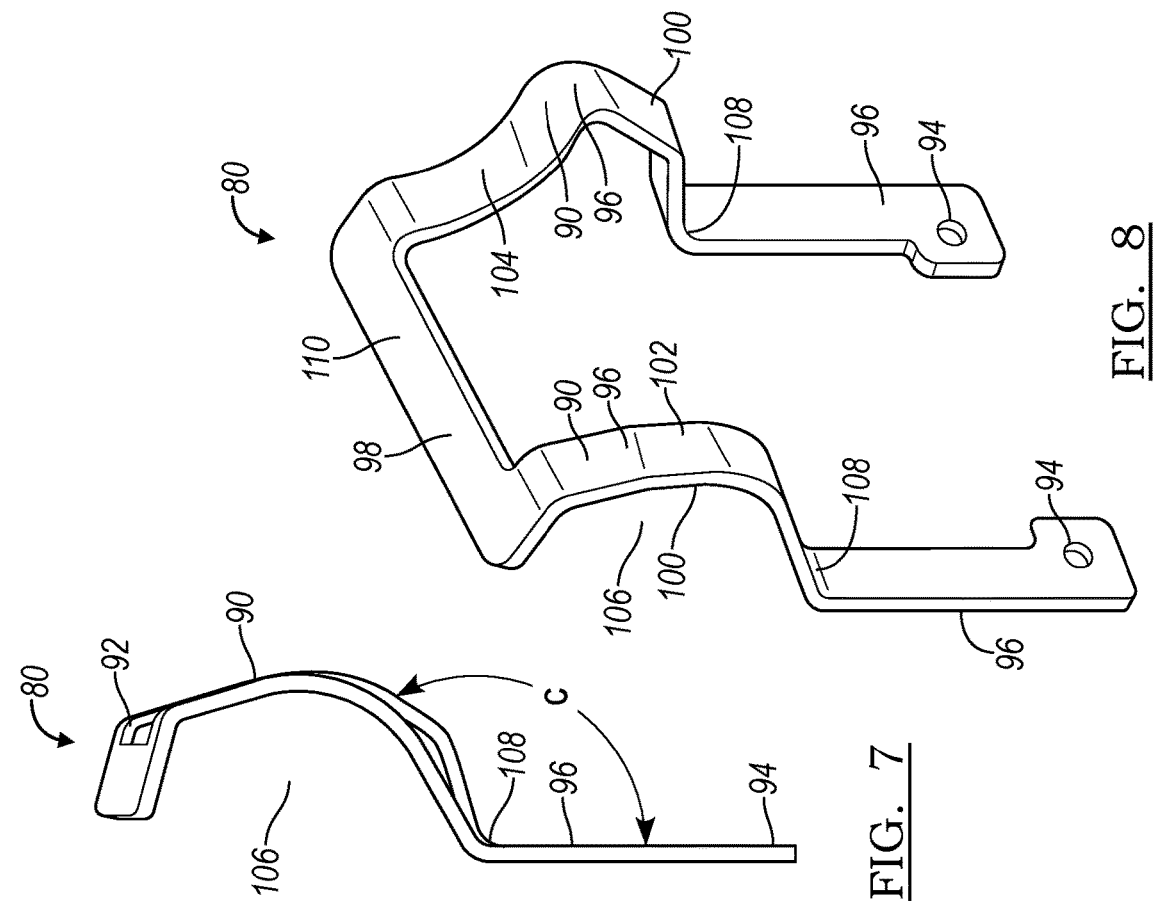
FIG. 8
FIG. 7
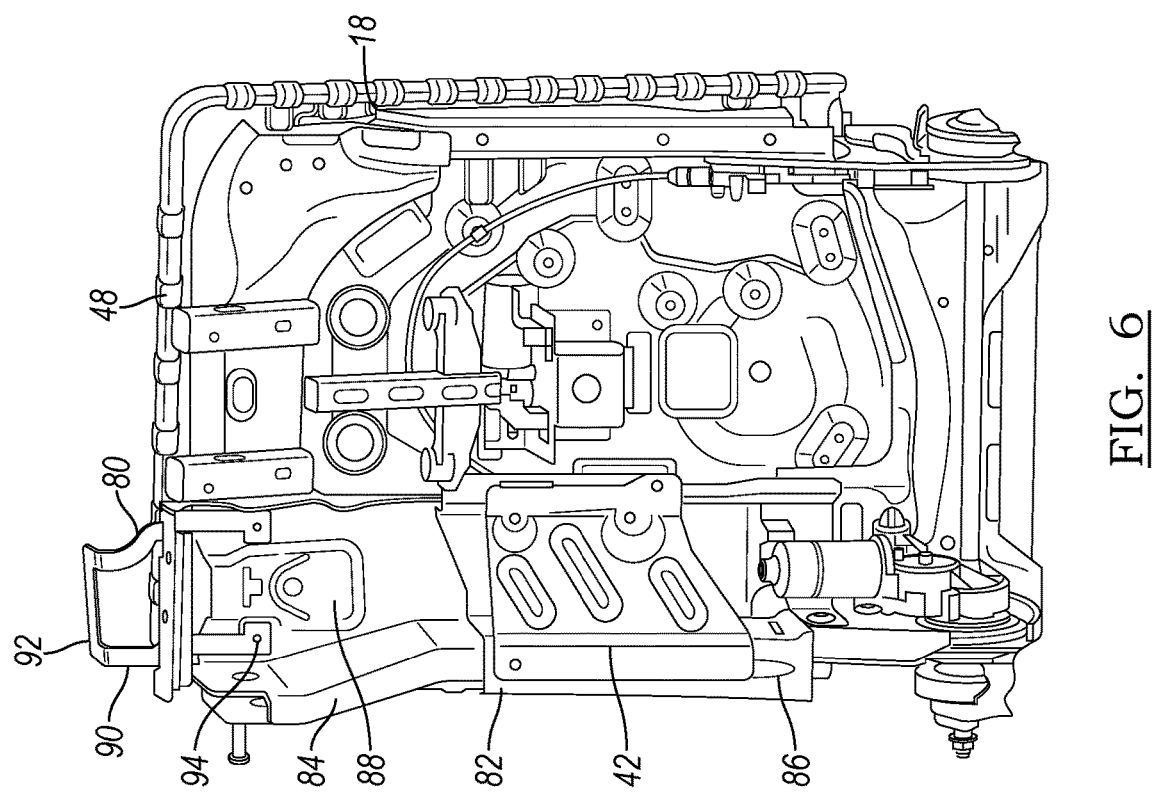
FIG. 6

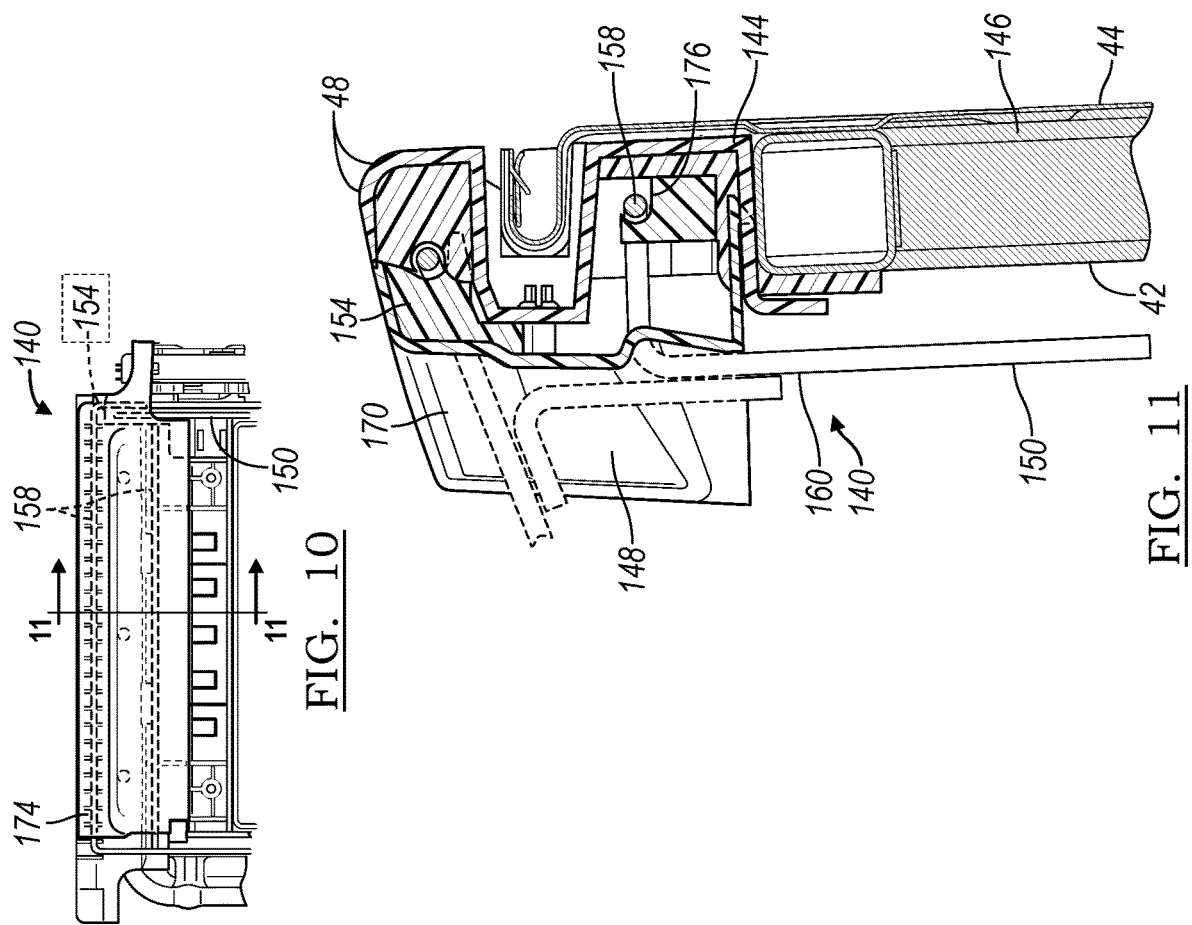
FIG. 10
FIG. 11
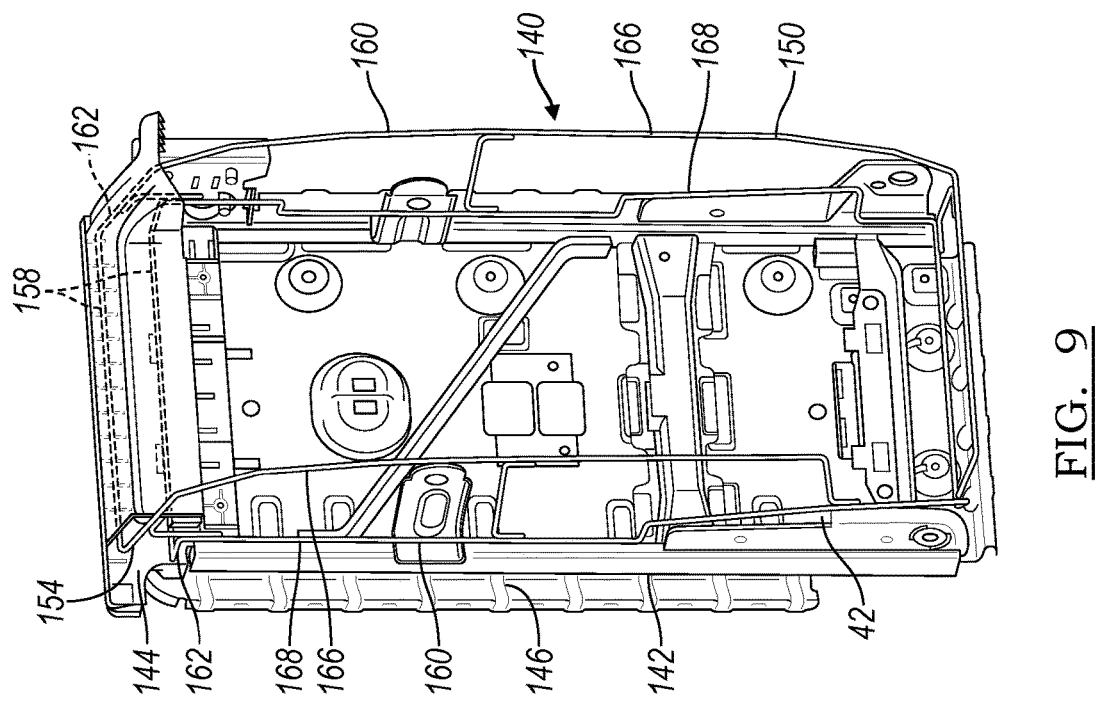
FIG. 9

REAR OCCUPANT IMPACT ABSORPTION ASSEMBLY

CROSS-REFERENCE TO RELATED APPLICATIONS

This application is a divisional of Ser. No. 16/269,883 filed on Feb. 7, 2019, now U.S. Pat. No. 10,974,624, which claims foreign priority benefits under 35 U.S.C. § 119(a)-(d) to DE 10 2018 202 032.9, filed Feb. 9, 2018, the disclosure of which are hereby incorporated by reference in their entirety.

TECHNICAL FIELD

The present disclosure provides an impact absorption structure for a forward seat assembly for protecting a rearward occupant.

BACKGROUND

During rapid deceleration or a crash, the rear occupant may contact the forward seat. Structures in the forward seat may absorb energy from the impact to reduce forces and thereby reduce the potential of bodily injury to the rear occupant.

SUMMARY

According to at least one embodiment, an impact absorption assembly for a seat back is provided having a wireframe structure adapted to be attached to a forward surface of a seat back structure, the wireframe structure having an upper deformation zone. The upper deformation zone deforms plastically upon an impact from a rearward direction.

In another embodiment, the impact absorption assembly has a plastic cover disposed over the upper deformation zone, wherein the upper deformation zone and plastic cover deform plastically upon an impact from a rearward direction.

In another embodiment, the plastic cover has an inner cover portion adapted to be connected to the seat back structure and an outer cover portion. At least a portion of the wireframe structure is disposed between the inner and outer cover portions.

In another embodiment, the deformation zone is defined by a pair of wireframe segments extending laterally in a width direction.

In another embodiment, the pair of wireframe segments are spaced apart from each other in the upright direction, wherein at least one of the wireframe segments is positioned above a top surface of the seat back structure.

According to at least one other embodiment, an impact absorption assembly for a seat back is provided having an elongated metal extrusion extending a length and adapted to be attached below a top surface of a seat back structure. The metal extrusion has a deformation zone formed as a partial-tube extending along the length. The tube deforms plastically upon an impact from a rearward direction.

In another embodiment, the partial-tube has an opening along circumference and extending along the length of the partial-tube, wherein upon the impact, the deformation zone is plastically deformed thereby closing the opening.

In another embodiment, the opening is concealed by a connecting portion that connects the partial-tube to a mounting portion, wherein the concealed portion and connecting portion extend the length of the elongated metal extrusion.

In another embodiment, the elongated extrusion has a substantially constant cross-section along the length.

According to at least one more embodiment, an impact absorption assembly for a seat back is provided having a metal bracket adapted to be attached to a seat back structure at a mounting location. The metal bracket has at least one deformation portion having a curved protruding portion that extends away from the mounting location and is adapted to be positioned above a top surface of the seat back. The metal bracket deforms plastically along the protruding portion upon an impact from a rearward direction.

In another embodiment, the impact absorption assembly has a pair of supporting bracket segments extending upright in an upright direction from the mounting location and defining a second deformation zone.

In another embodiment, the pair of brackets segments are spaced apart a distance from the seat back structure in the rearward direction, wherein upon the impact, the bracket segments plastically deform to decrease the distance.

In another embodiment, the metal bracket comprises a lateral connecting segment extending in a lateral direction between the pair of upright bracket segments.

In another embodiment, the lateral segment is spaced apart in the upright direction from the mounting location.

In another embodiment, the pair of upright segments are asymmetric to each other.

In another embodiment, the pair of upright segments each have a curved contour that protrudes in the forward direction.

In another embodiment, a vehicle seat is provided an has a seat back structure having a rigid upper portion being more rigid than a lower portion. An impact absorption is connected to the rigid upper portion.

In another embodiment, the rigid upper portion comprises a seatbelt tower adapted to secure a seatbelt assembly.

In another embodiment, the rigid upper portion defines at least a portion of the top surface of the seat back structure.

In another embodiment, rigid upper portion is adapted to secure a head restraint assembly.

BRIEF DESCRIPTION OF THE DRAWINGS

FIG. 6 illustrates a front view of a portion of a seat back FIG. 1 according to another embodiment of the present disclosure.

FIG. 7 illustrates a side view of an impact protection bracket in FIG. 6.

FIG. 8 illustrates a front perspective view of the impact protection bracket in FIG. 7.

FIG. 9 illustrates a front view of a portion of a seat back FIG. 1 according to another embodiment of the present disclosure.

FIG. 10 illustrates a detailed front view of an impact protection assembly in FIG. 9.

FIG. 11 illustrates a section view through section 11-11 of a portion of the impact protection assembly in FIG. 10.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
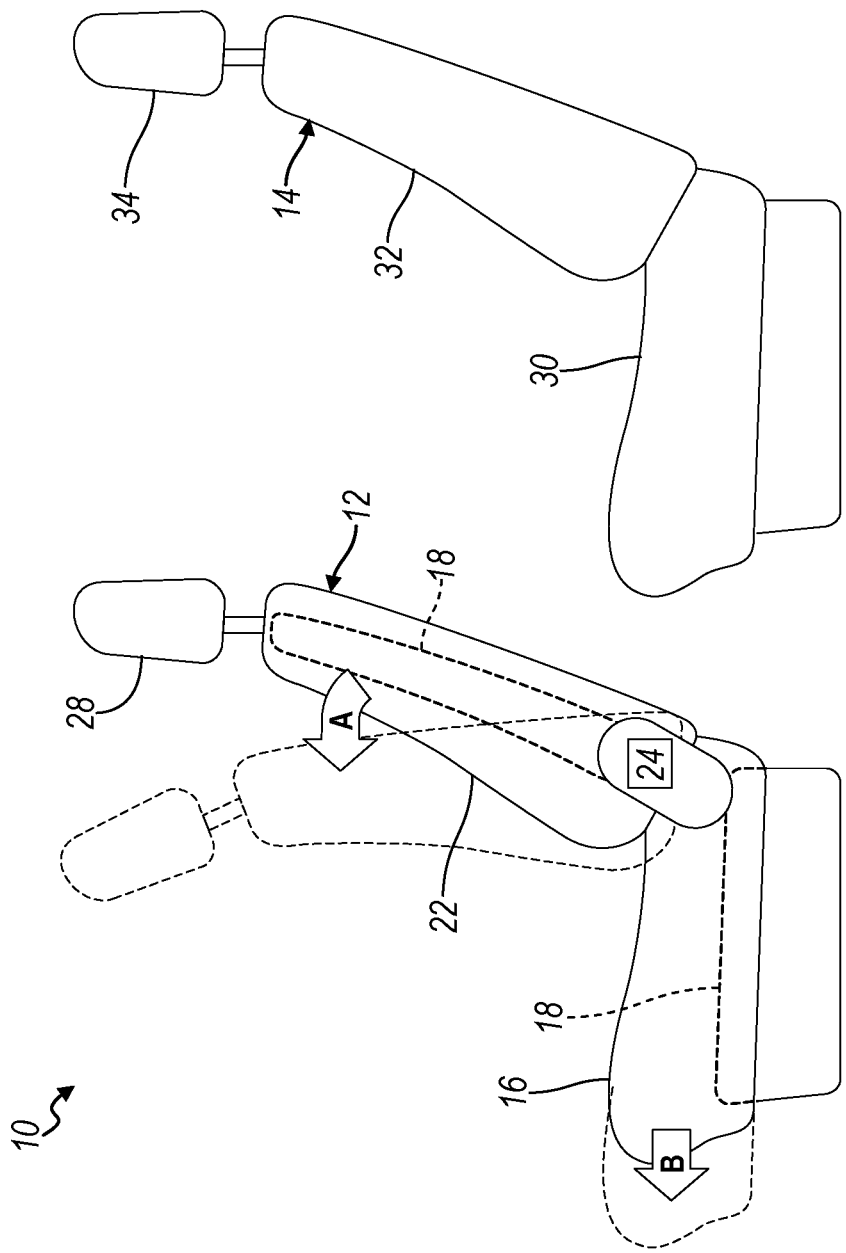
FIG. 1 is a schematic view of a seat assembly according to at least one embodiment of the present disclosure.

A seat assembly 10 is illustrated in FIG. 1. An impact absorption assembly is provided for a seat back of a forward vehicle seat 12 of a vehicle. The impact absorption assembly the forward seat 12 for protects passengers in the rear seat 14 by absorbing energy if the rear seat passenger contacts the forward seat during a collision. For example, impact absorption assembly absorbs energy of high head acceleration of the rear passenger during a head-on or front collision.

As shown in FIG. 1, the forward seat 12 and a rear seat 14 are adapted to be mounted to a vehicle body, as is known in the art. The forward seat 12 and a rear seat 14 may be installed in any vehicle, such as an automobile or any vehicle with multiple rows of seats. The forward seat 20 and a rear seat 22 may be a driver's side seat or a passenger side seat or even a middle seat. The forward vehicle seat 12 may be a front seat, or a middle row seat where a rear seat 14 is provided rearward of the vehicle seat 12.

The forward seat 12 includes a seat bottom 16 that is adapted to be adjustably mounted in the vehicle along a seating rail or frame 18. The seat bottom 16 and frame 18 may include mounting hardware with fore/aft adjustment, as is known in the art. As such, the seat bottom 16 may be translated along arrow B in the fore-aft direction.

The front seat 12 also includes a seat back 22 which is adapted to be pivotally connected to the vehicle body adjacent to the seat bottom 16, as is known in the art. The seat back 22 may be pivotally connected to the seat bottom 16 by a recline mechanism 24, which is also known in the art. Alternatively, the seat back 22 could be pivotally connected to the vehicle body via the recline mechanism 24. For example, the seat back 22 may be pivoted in the direction of arrow A. A head restraint 28 is supported upon the seat back 22. The head restraint 28 may be mounted to a pair of posts extending from the seat back 22 for supporting the head restraint 28, and optionally providing height adjustment.

The seating assembly 10 also includes the rear seat 14. As shown in FIG. 1, the rear seat 14 is a second-row seat, but the seat assembly 10 may have any number of rows. The rear seat 14 includes a seat bottom 30 adapted to be operably connected to a vehicle body for adjustment to between at least an upright and a stored position. The rear seat 14 also includes a seat back 32 operably connected to the vehicle body adjacent to the seat bottom 30 for adjustment to an upright position and a stored position. A head restraint 34 is supported upon the seat back 32. The head restraint 34 may be mounted to a pair of posts extending from the seat back 32 for supporting the head restraint 34, and optionally providing height adjustment. The head restraint 34 is also pivotally connected to the seat back 32 for stowing or folding the head restraint 34 when not in use.

Figure 2:
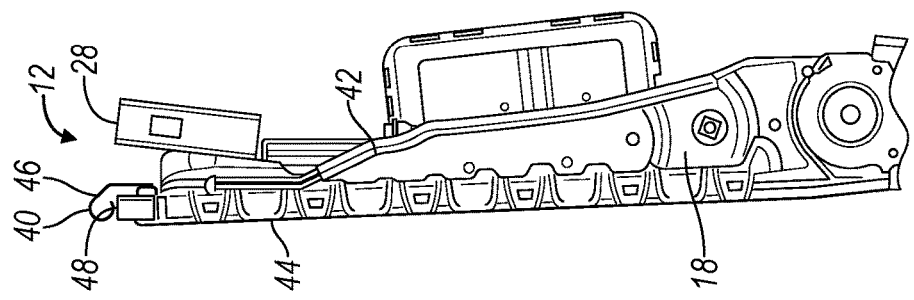
FIG. 2 illustrates a side view of a portion of a seat back of FIG. 1 according to one embodiment of the present disclosure.

FIGS. 2-5 illustrate one embodiment of an impact protection assembly 40 for a forward seat 12 for protecting a rear occupant in a rear seat 14. As shown in FIG. 2, the seat 12 includes a seat back frame 18 that is adapted to be oriented in a vehicle so that a forward seating surface 42 faces forward and a rear surface 44 faces the rear seat 14. The forward seat 12 has the impact protection assembly 40 including a metal insert 46 positioned adjacent to a top surface 48 of the frame 18. The insert 46 is an elongated extrusion having a constant cross-section along a length. The insert 46 may be formed of a metal sheet that is formed, rolled or bent to achieve the shape. Alternately, the insert 46 may be extruded or formed of any suitable method. The insert 46 may also be formed of other suitable materials such as plastic, for example.

The insert 46 has a deformable portion 50 that is positioned above the top surface 48. The insert 46 extends along the width of the seat back frame 18 so the deformable portion 50 substantially covers the top surface 48 of the frame 18. The insert 46 also has an attachment portion 54 for attaching the metal insert 46 to the frame 18.

In the event of a collision or crash, the deformable portion 50 would deform upon impact by an object, such as the head or body of a rear row occupant, thereby providing energy absorption and minimizing injury compared to if the rear occupant had impacted the rigid frame 18.

Figure 4:
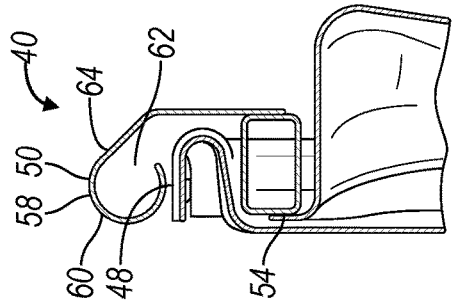
FIG. 4 illustrates a section view through section 4-4 of FIG. 3.

The deformable portion 50 is formed as a partial-tube 58 extending along the length of the metal insert 46 and the width of the seat 12. As shown in the cross-section in FIG. 4, the partial-tube 58 has an arched section 60 that forms a portion of a circle. The partial-tube 58 has an elongated opening 62 opposite the arched section 60. The elongated opening 62 also extends the length of the metal insert 46 and the width of the seat 12. A connecting leg 64 extends between the arched section 60 of the deformable portion 50 and the attachment portion 54. As shown in FIG. 4, the elongated opening 62 is concealed by the connecting leg 64.

In another embodiment, the elongated opening 62 may be visible and not concealed by the connecting leg 64.

Upon an impact by an object, the partial-tube 58 is plastically deformed. The arch section 60 may deform to close the elongated opening 62 or may be crushed and compacted against the top surface 48 of the frame 18. The connecting leg 64 may also bend and plastically deform.

Figure 5:
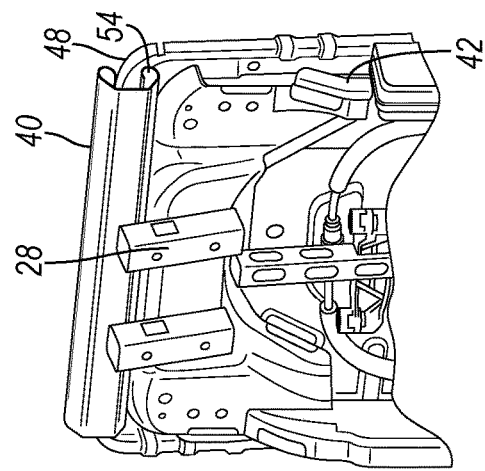
FIG. 5 illustrates a front perspective view of the portion of the seat back of FIG. 2.
Figure 3:
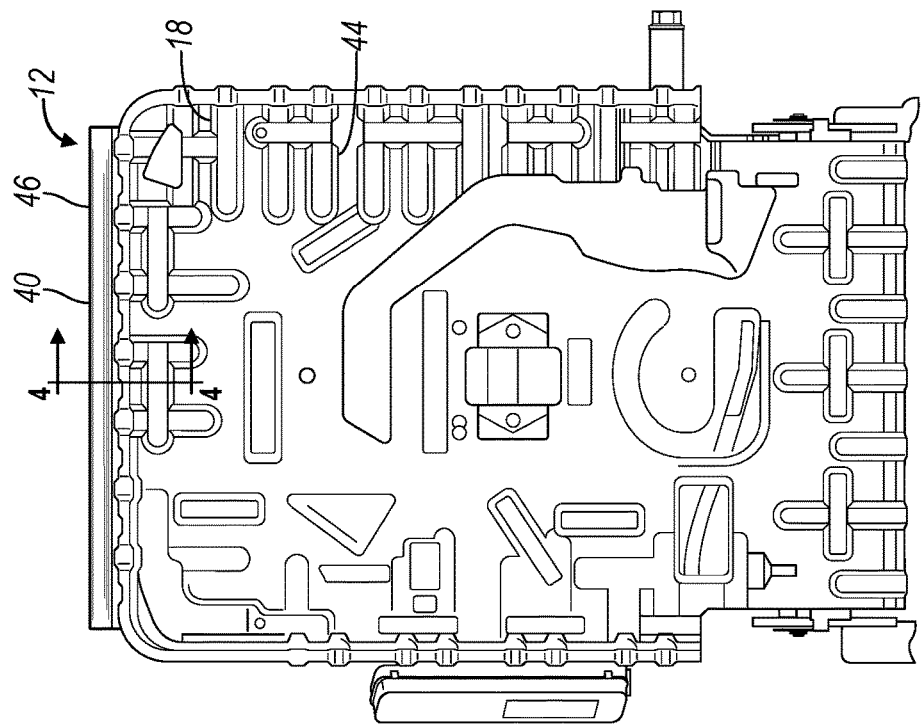
FIG. 3 illustrates a rear view of a portion of the seat back of FIG. 2.

FIGS. 6-8 illustrate a front seat 12 having an impact absorption assembly 80 according to another embodiment. The vehicle seat 12 has a seat back structure 82 that may form the seat back frame 18 and provide rigidity to the seat back. The seat structure 82 has a rigid upper portion 84 being more rigid than a lower portion 86. As shown in FIG. 5, the rigid upper portion 84 may be a seatbelt tower 88 adapted to secure a seatbelt assembly to the seat back 22. In another embodiment, the rigid upper portion is adapted to secure a head restraint assembly, for example.

The impact absorption assembly 80 connected to the rigid upper portion 84, the impact absorption assembly 80 has a deformation zone 90 extending rearward from the seat back structure 82. Upon an impact by an object from a rearward direction, the deformation zone 90 plastically deforms.

As shown in FIGS. 6-8, the impact absorption assembly 80 may be a metal bracket 92 adapted to be attached to the forward surface 42 of the seat back structure at a mounting location 94. The bracket 92 may also be formed of other suitable materials such as plastic, for example. As shown in FIG. 7, the bracket 92 has at least one deformation zone 90 that extends above the top surface 48 and also extends forward from the mounting location 94.

The deformation zone 90 may have a pair of bracket segments 96 connected by a connection segment 98. The pair of bracket segments 96 extend upright in an upright direction from the mounting location 94. 18. The pair of upright bracket segments 96 each have a curved contour that protrudes in the forward direction, as illustrated in FIGS. 6-8. In another embodiment, the curved contour may protrude in the rearward direction.

The deformation zone 90 is defined by the pair of protruding portions 100 along each of the upright bracket segments 96 connected by the connection segment 98. The connection segment 98 extends in a lateral direction between the pair of upright bracket segments 96. The lateral connection segment 98 is spaced apart in the upright direction from the mounting locations 94 and is spaced apart from the top surface 48 of the seat back structure 82.

As shown in FIGS. 6-8, wherein the pair of upright segments 96 are asymmetric to each other. The first protruding portion 102 may be different than the second protruding portion 104 due to packaging constraints, for example. The bracket 92 has an opening 106 opposite the protruding portions 100. The opening 106 is defined below the connection segment 98.

As illustrated in FIGS. 6-8, the pair of protruding portions 100 of the connection segment 98 are spaced apart a distance from the top surface 48 of the seat back structure 82 in the upward direction. Upon impact from an object, the deformation zone 90 of the metal bracket 92 plastically deforms to absorb energy from the impact. The deformation zone 90 plastically deforms to decrease the distance of the connection segment 98 to the top surface 48 of the seat back structure 82. The connection segment 98 may be crushed and compacted toward the top surface 48 by closing the opening 106. of the impact protection.

The shape and design of the bracket 92 provides at least three deformation zones of plastic deformation in three directions for energy absorption during a rear impact. First, the deformation zone 90 may crumple and change the curvature of the protruding portions 100. As the during deformation, the protruding portions 100 may extend in the forward direction as they crumple.

Second, the bracket 92 may bend at a second deformation zone 108. The bracket 92 forms a first bent angle C at the intersection of the mounting legs 94 and the protruding portions 100. The bracket 92 may bend forward anywhere along the upright segments 96. During impact, the second deformation zone 108 at the intersection bends and plastically deforms to a second bent angle less than the original bent angle C. The original formed bent angle C may be between and 90-degrees 130-degrees. In another embodiment, the original bent angle C may be between and 105-degrees and 120-degrees. As shown in FIG. 7, the bent angle C may be different for each of the first protruding portion 102 and the second protruding portion 104.

Finally, the bracket 92 may have a third deformation zone 110 along the connection segment 98. The bracket 92 may absorb energy during an impact by as the connecting segment 98 is moved in the downward direction toward the top surface 48. Additionally, the connecting segment 98 may plastically deform and create a dent between the pair of upright bracket segments 96.

FIGS. 9-11 illustrate a front seat 12 having an impact absorption assembly 140 according to another embodiment. The vehicle seat 12 has a seat back structure 142 that may form the seat back frame 18 and provide rigidity to the seat back 22.

The impact absorption assembly 140 includes a wireframe structure 150 adapted to be attached to a front surface 42 of a seat back structure 142. The wireframe structure 150 has an upper deformation zone 154 that deforms plastically upon an impact from a rearward direction. The deformation zone 154 is defined by a pair of transverse wireframe segments 158 extending laterally in a width direction. The transverse wireframe segments 158 are spaced apart from each other in the upright direction.

The transverse wireframe segments 158 are spaced apart a distance from the seat back frame structure 142. Upon impact from an object from the rearward direction, the wireframe segments 158 plastically deform.

The wireframe structure 150 comprises a pair of upright wireframe portions 160 each extending in an upright direction from outboard lateral sides 162 of the transverse wireframe segments 158. The upright wireframe portions 160 have a forward or outward upright segment 166 that is spaced apart from the seat back structure 142 to define a front contour of the seat back 22. The upright wireframe portions 160 may also have an inward upright segment 168 that positioned adjacent to the seat back structure 142 and may be attached to the seat back frame structure 142.

The wireframe structure 150 may be integrated in the foam part of the seat back 22. For example, attachment portions of the wireframe structures 150, such as the inward upright segments 168, may be over-molded with the foam part of the seat back 22.

The impact absorption assembly 140 may also include a plastic cover 170 disposed over the upper transverse wireframe segments 158. The wireframe structure 150 provides fixation locations to easily attach additional components for aiding in impact protection. Separate fixation points on the seat back 22 are not required. The plastic cover 170 deforms plastically upon an impact from a rearward direction. The plastic cover 170 includes clip features 176 to secure the plastic cover 170 to the wireframe structure 150. The clip features 176 allow the plastic cover 170 to attach to the wireframe structure 150 with a snap-fit or other interference fit.

The plastic cover 170 may include an inner cover portion 144 and an outer cover portion 148. As shown in FIG. 11, the inner cover portion 144 is attached to the metal seat back frame 142. The wireframe structure 150 is attached to the inner cover 144, and then the outer cover is attached to the wireframe structure 150. At least one of the transverse wireframe segments 158 is retained in clip feature 176 formed on the inner cover portion 144. The clip feature 176 may allow the wireframe structure 150 to attach to the inner plastic cover 144 with a snap-fit or other interference fit.

Figure 12:
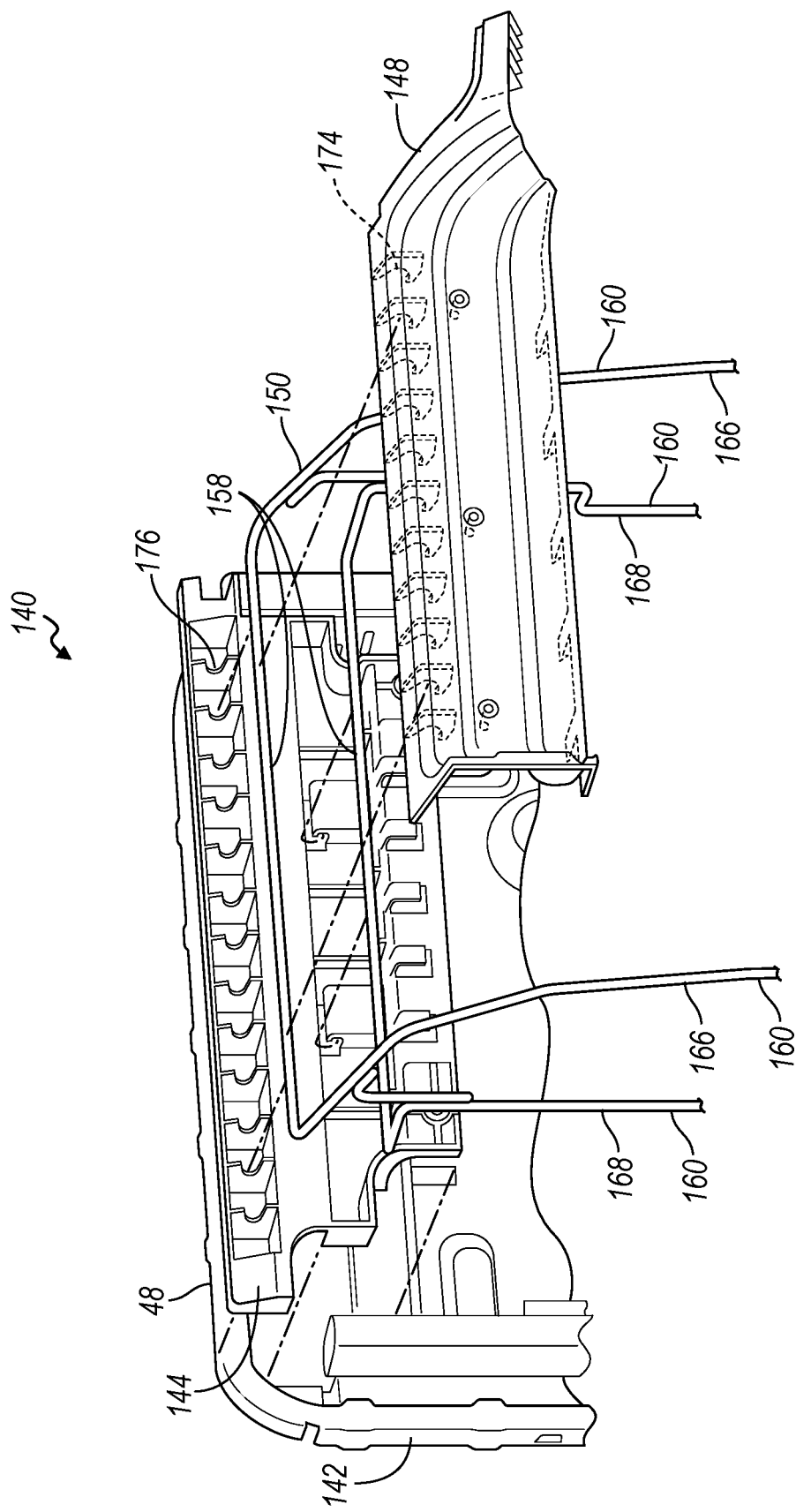
FIG. 12 illustrates an exploded view of the seat back and impact absorption assembly 140 with the components separated.

The plastic cover 170 may also include an outer cover portion 148. FIG. 12 illustrates an exploded view of the seat back and impact absorption assembly 140 with the components separated. As shown in FIG. 12, the wireframe structure 150 is positioned between the inner cover portion 144 and outer cover portion 148. The transverse wire segments 158 of the wireframe structure 150 mate with the retention features 174 on the outer cover portion 148 and clip features 174 on the inner cover portion 144.

The wireframe structure 150 is attached to the inner cover portion 144, and then the outer cover portion 148 is attached to the wireframe structure 150. The outer cover portion 148 may include a retention feature 174 formed on an inner surface of the outer cover portion 148 that attaches to at least one of the transverse wireframe segments 158. The retention feature 174 may allow the outer cover portion to attach to the wireframe structure 150 with a snap-fit or other interference fit.

Although FIG. 12 shows the inner cover portion 144 spaced away from the seat back frame structure 142, the inner cover 144 abuts the seat back frame structure 142, as shown in FIG. 11. As shown in FIG. 11, the plastic cover 170, including the inner and outer covers 144, 148, extend above the top surface 48 of the seat back structure 142. The plastic cover 170 extends transversely in the lateral direction to cover the top surface 48 along substantially the entire lateral width of the seat back structure 142. As also illustrated in FIGS. 9-11, at least one transverse wireframe segment 158 is positioned above the top surface 48 of the seat back frame structure 142.

The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An impact absorption assembly for a seat back comprising:
   a seat back structure; and
   a wireframe structure adapted to be attached to a rear surface of the seat back structure, the wireframe structure having an upper deformation zone;
   wherein the upper deformation zone deforms plastically upon an impact from a rearward direction,
   wherein the deformation zone is defined by wireframe segments that are spaced apart by a distance in the rearward direction from the seat back structure, wherein upon the impact, the wireframe segments plastically deform to decrease the distance.

2. The impact absorption assembly of claim 1, further comprising a plastic cover disposed over the upper deformation zone, wherein the upper deformation zone and plastic cover deform plastically upon an impact from a rearward direction.

3. The impact absorption assembly of claim 2, wherein the plastic cover comprises an inner cover portion adapted to be connected to the seat back structure and an outer cover portion, wherein at least a portion of the wireframe structure is disposed between the inner and outer cover portions.

4. The impact absorption assembly of claim 1, wherein the wireframe segments comprise a pair of upright wireframe portions each extending in an upright direction from outboard lateral sides of the deformation zone.

5. The impact absorption assembly of claim 4, wherein the wireframe segments comprise a pair of transverse wireframe segments extending laterally in a width direction.

6. The impact absorption assembly of claim 5, wherein at least one of the wireframe segments is positioned above a top surface of the seat back structure.

7. The impact absorption assembly of claim 5, wherein the pair of wireframe segments are spaced apart from each other in the upright direction.

8. The impact absorption assembly of claim 1, wherein the deformation zone is defined by a pair of the wireframe segments extending laterally in a width direction.

9. The impact absorption assembly of claim 8, wherein the pair of wireframe segments are spaced apart from each other in the upright direction.

10. The impact absorption assembly of claim 8, wherein at least one of the wireframe segments is positioned above a top surface of the seat back structure.

11. An impact absorption assembly for a seat back comprising:
    a wireframe structure adapted to be attached to a rear surface of a seat back structure, the wireframe structure having an upper deformation zone; and
    a plastic cover disposed over the upper deformation zone,
    wherein the plastic cover and upper deformation zone deform plastically upon an impact from a rearward direction.

12. The impact absorption assembly of claim 11, wherein the plastic cover comprises an inner cover portion adapted to be connected to the seat back structure and an outer cover portion, wherein at least a portion of the wireframe structure is disposed between the inner and outer cover portions.

13. The impact absorption assembly of claim 11, wherein the wireframe structure is defined by wireframe segments spaced apart by a distance from the seat back structure in the rearward direction, wherein upon the impact, the wireframe segments plastically deform to decrease the distance.

14. The impact absorption assembly of claim 11, wherein the wireframe structure comprises a pair of upright wireframe portions each extending in an upright direction from outboard lateral sides of the deformation zone.

15. The impact absorption assembly of claim 11, wherein the deformation zone is defined by a pair of wireframe segments extending laterally in a width direction.

16. The impact absorption assembly of claim 15, wherein the pair of wireframe segments are spaced apart from each other in the upright direction.

17. The impact absorption assembly of claim 15, wherein at least one of the wireframe segments is positioned above a top surface of the seat back structure.

18. An impact absorption assembly for a seat back, comprising:
    a seat back structure; and
    a wireframe structure adapted to be attached to a rear surface of the seat back structure, the wireframe structure having an upper deformation zone,
    wherein the wireframe structure comprises a pair of upright wireframe portions each extending in an upright direction from outboard lateral sides of the deformation zone,
    wherein the deformation zone deforms plastically upon an impact from a rearward direction.

19. The impact absorption assembly of claim 18, further comprising a plastic cover disposed over the upper deformation zone, wherein the upper deformation zone and plastic cover deform plastically upon an impact from a rearward direction.

20. The impact absorption assembly of claim 19,
    wherein the deformation zone is defined by the pair of upright wireframe portions spaced apart by a distance from the seat back structure in the rearward direction, wherein upon the impact, the pair of upright wireframe portions plastically deform to decrease the distance.

21. The impact absorption assembly of claim 19, wherein the plastic cover comprises an inner cover portion adapted to be connected to the seat back structure and an outer cover portion, wherein at least a portion of the wireframe structure is disposed between the inner and outer cover portions.

* * * * *